(12) United States Patent
Murugaiah et al.

(10) Patent No.: US 11,501,259 B2
(45) Date of Patent: Nov. 15, 2022

(54) TRAINING AN AVATAR TO ASSIST A USER IN CAREER ADVANCEMENT

(71) Applicant: MiPS Systems Inc, Ashburn, VA (US)

(72) Inventors: Prabakaran Murugaiah, Ashburn, VA (US); Muthulakshmi Sankaralingam, Ashburn, VA (US)

(73) Assignee: MIPS SYSTEMS INC., Ashburn, VA (US)

( * ) Notice: Subject to any disclaimer, the term of this patent is extended or adjusted under 35 U.S.C. 154(b) by 0 days.

(21) Appl. No.: 17/716,206

(22) Filed: Apr. 8, 2022

(65) Prior Publication Data
US 2022/0230143 A1    Jul. 21, 2022

(51) Int. Cl.
*G06Q 10/10* (2012.01)
*G06Q 10/06* (2012.01)

(52) U.S. Cl.
CPC ... *G06Q 10/1053* (2013.01); *G06Q 10/06311* (2013.01); *G06Q 10/06316* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | | |
|---|---|---|---|---|
| 11,145,018 B2* | 10/2021 | Alkan | ..................... | G06N 20/20 |
| 2005/0096973 A1* | 5/2005 | Heyse | ................... | G06Q 10/105 |
| | | | | 705/320 |
| 2005/0125283 A1* | 6/2005 | Fan | ..................... | G06Q 10/1053 |
| | | | | 705/321 |
| 2009/0144639 A1* | 6/2009 | Nims | ..................... | G06N 3/006 |
| | | | | 715/757 |
| 2010/0082356 A1* | 4/2010 | Verma | ................... | G06Q 10/105 |
| | | | | 705/320 |
| 2015/0140526 A1* | 5/2015 | Marino | ..................... | G09B 7/00 |
| | | | | 434/353 |
| 2016/0379170 A1* | 12/2016 | Pande | ................. | G06Q 10/1053 |
| | | | | 705/321 |
| 2016/0379516 A1* | 12/2016 | Martinez | ................. | G09B 5/02 |
| | | | | 434/219 |

(Continued)

OTHER PUBLICATIONS

Liu, Ye, et al. "Fortune teller: predicting your career path." Proceedings of the AAAI conference on artificial intelligence. vol. 30. No. 1. 2016 (Year: 2016).*

(Continued)

*Primary Examiner* — Alan S Miller
(74) *Attorney, Agent, or Firm* — Shumaker, Loop & Kendrick, LLP

(57) ABSTRACT

A system and a method to train an avatar to assist a user for career advancement. User information including academic qualifications and work experience is received from the user. A training program including a sequence of questions and template response is dynamically designed based on the user information. Further, the user is nudged with a question from the sequence of questions. Career aspirations including job preferences, a timeline, career goals and a behavioral characteristic of the user are predicted based on a user response to the question and the user information. Further, a career path is determined for the user based on the career aspirations and the user information. The career path includes a set of steps and a schedule to complete the set of steps. Finally, an avatar is trained based on the career path.

15 Claims, 5 Drawing Sheets

(56) References Cited

U.S. PATENT DOCUMENTS

2017/0286824 A1* 10/2017 Tormasov ............ G06Q 10/101
2019/0303798 A1* 10/2019 Xie ........................ G06Q 50/01
2020/0143498 A1* 5/2020 Alkan ................ G06Q 50/2057
2020/0302296 A1* 9/2020 Miller .................... G06N 20/20

OTHER PUBLICATIONS

Ezenkwu, C. P., E. H. Johnson, and O. B. Jerome. "Automated Career Guidance Expert System Using Case-Based Reasoning." Computing, Information Systems, Development Informatics & Allied Research Journal (2015). (Year: 2015).*

* cited by examiner

TRAINING AN AVATAR TO ASSIST A USER IN CAREER ADVANCEMENT

TECHNICAL FIELD

The present subject matter described herein, in general, relates to a system and a method for training an avatar to assist a user in career advancement.

BACKGROUND

Job hunting is a tedious process. Job hunting has been simplified with online listings and applications as a result of increased digitization. Even with the simplification, in today's competitive job market, job seekers need to jump through various hurdles to find a job suitable for them. The hurdles may include taking counseling sessions, submitting multiple applications, and giving the same answers repeatedly in different interviews, resulting in a lot of wasted time and effort.

With the improvement in computer technology, artificial intelligence, and automation, machines can now execute jobs much more efficiently and even perform tasks that were once only possible for a human. Utilizing these technologies, existing tools can suggest a job based on resumes and job listings on the internet. The existing tools treat job hunting as a one-step process of finding a job listing that matches a resume. The existing tools today have one common problem. The problem is that the application process is tedious, repetitive, and consumes a lot of time for applicants. The existing tools do not understand the requirements of an applicant. Therefore, the existing tools fail to help with the application process. With the uprise of virtual reality and metaverse, the process of job hunting must change, and the conventional methods of submitting resumes and booking appointments for interviews will be obsolete.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method to train an avatar to assist a user in career advancement. This summary is not intended to identify essential features of the claimed subject matter nor is it intended for use in determining or limiting the scope of the claimed subject matter.

In one implementation, a system to train an avatar to assist a user in career advancement is disclosed. Initially, the system may receive an input from a user to select an avatar. Subsequently, the system may receive user information from the user. The user information may comprise academic qualification and work experience of the user. Further, a training program may be dynamically designed based on the user information. The training program may be designed using deep learning and machine learning algorithms. The training program may comprise a sequence of questions determined based on the user information and template response for one or more questions of the sequence of questions. It may be noted that the sequence of questions may be determined based on the user information. The sequence of questions may be determined using reinforcement learning technique. Further, the system may nudge a user with a question from the sequence of questions. The question may be asked to the user in real time based on the training program. Further, the system may predict career aspirations of the user based on a user response to the question and the user information. The career aspirations may be predicted using artificial intelligence techniques. The career aspirations may comprise job preferences, a timeline, career goals and a behavioral characteristic of the user. Further, the system may determine a career path for the user based on the career aspirations and the user information. The career path may comprise a set of steps and a schedule to complete the steps. Finally, the system may train an avatar based on the career path. The avatar may be trained using federated learning and edge computing. It may be noted that the avatar may assist the user through the career path by performing a subset of steps from the set of steps on behalf of the user. In an embodiment, the avatar may be a digital representation of the user. In one aspect, the aforementioned method to train an avatar to assist a user for career advancement may be performed by a processor using programmed instructions stored in a memory.

In another implementation, a non-transitory computer program product having embodied thereon a computer program to train an avatar to assist a user for career advancement is disclosed. The program may comprise a program code for receiving an input from a user to select an avatar. Further, the program may comprise a program code for receiving user information from a user. The user information may comprise academic qualifications and work experience of the user. Further, the program may comprise a program code for dynamically designing a training program based on the user information using deep learning and machine learning algorithms. The training program may comprise a sequence of questions and template response for one or more questions of the sequence of questions. The sequence of questions may be determined based on the user information. The sequence of questions may be determined using reinforcement learning technique. Further, the program may comprise a program code for nudging a user with a question from the sequence of questions. The question may be asked to the user in real time based on the training program. Further, the program may comprise a program code for predicting career aspirations of the user based on a user response to the question and the user information. The career aspirations may be predicted using artificial intelligence techniques. The career aspirations may comprise job preferences, a timeline, career goals and a behavioral characteristic of the user. Further, the program may comprise a program code for determining a career path for the user based on the career aspirations and the user information. The career path may comprise a set of steps and a schedule to complete the steps. Finally, the program may comprise a program code for training an avatar based on the career path. The avatar may be trained using federated learning and edge computing. It may be noted that the avatar may assist the user through the career path by performing a subset of steps from the set of steps on behalf of the user. In an embodiment, the avatar may be a digital representation of the user.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system to train an avatar to assist a user in career advancement.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Figure 1:
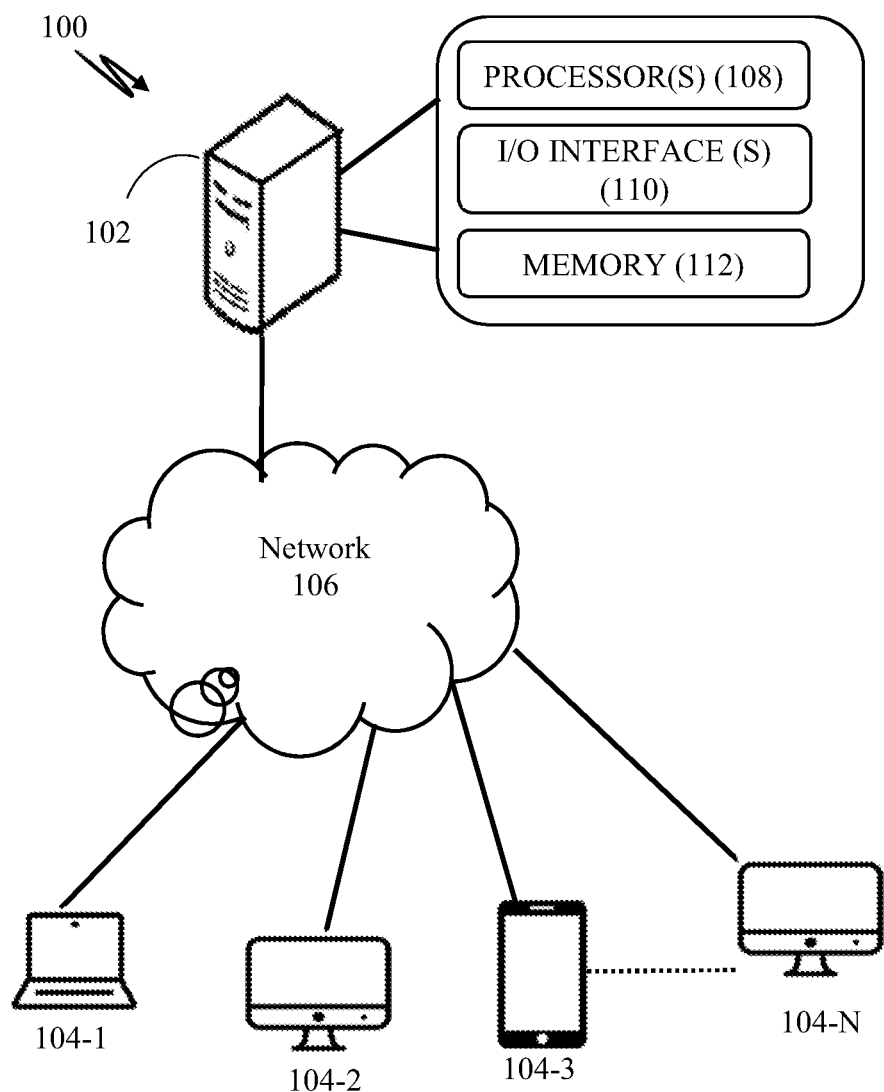
FIG. 1 illustrates a network implementation of a system to train an avatar to assist a user in career advancement, in accordance with an embodiment of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "designing," "nudging," "predicting," "determining," "training," and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present invention aims to design a system to train an avatar to assist a user in career advancement. Initially, the system may receive an input from a user to select an avatar. Further, the user may submit user information comprising academic qualifications and work experience of the user. Further, the system may dynamically design a training program to train an avatar based on the user information. The training program may comprise a sequence of questions and template response for one or more questions of the sequence of questions. The sequence of questions may be determined based on the user information. Further, the system may nudge a user with a question from the sequence of questions.

The question may be asked to the user in real time based on the training program. Further, career aspirations of the user may be predicted based on a user response to the question and the user information. The career aspirations may correspond to job preferences, a timeline, career goals and a behavioral characteristic of the user. In an embodiment, the job preferences may be at least one of preferred time of work, responsibilities, a job role, a type of employer, or alike. The timeline may be a number of years specified by the user to achieve the career goals. Further, the system may determine a career path for the user based on the career aspirations and the user information. It may be noted that the timeline is set by the user. The career path may comprise a set of steps and a schedule to complete the steps. Finally, the system may train an avatar based on the career path. It may be noted that the avatar may assist the user through the career path by performing a subset of steps from the set of steps on behalf of the user. The avatar may be a digital representation of the user.

In an embodiment, the user may train the avatar by responding to the questions from the training program. The avatar may learn about the user based on the response. The user information may be used to determine the career path for the user. The avatar may be trained by the system to help the user in following the career path.

Certain technical challenges exist for training an avatar to assist a user in career advancement. One technical challenge includes predicting the user's career goals and job preferences. The solutions presented by the embodiments disclosed herein to address the above challenge are machine learning algorithms trained using Natural Language Processing (NLP) and Natural Language Understanding (NLU). The machine learning algorithms may be trained to classify user information and user response into career goals and job preferences. It may be noted that a set of machine learning algorithms may be required to classify the user information and user response. The one or more machine learning algorithms may comprise Logistic Regression, Naive Bayes, K-Nearest Neighbours, Decision Tree, Support Vector Machines.

Another technical challenge includes determining priority of a job preference. The solution presented by the embodiments disclosed herein to address this challenge includes assigning weights to the job preferences using Federated Learning Techniques and Reinforcement Learning Models. It may be noted that the Federated Learning techniques may be used to access the job preference and priority data from a plurality of systems connected through a network.

Another technical challenge includes receiving useful information from the user at regular intervals of time. The solution presented by the embodiments disclosed herein to address this challenge includes using Reinforcement Learning Models for dynamically designing a training program comprising a sequence of questions and template responses for the questions of the sequence of questions. The system may receive a user response for a question of the sequence of questions. Further, the system may evaluate the user response with the template response using NLP, NLU and the Reinforcement Learning algorithms. The system may update the sequence of questions based on the user responses and the evaluation. It may be noted that the system may nudge the user for responses at regular intervals of time.

Certain embodiments disclosed herein may provide one or more technical advantages. A technical advantage of the embodiments may include designing a training program in order to receive user response necessary for prediction of career goals and job preferences of the user. Another technical advantage may include prediction of the user's career goals and job preferences based on user information and user response. Another technical advantage of the embodiments may include updating the training program comprising a sequence of questions based on the user's response. Certain embodiments disclosed herein may provide none, some, or all of the above technical advantages. One or more other technical advantages may be readily apparent to one skilled in the art in view of the figures, descriptions, and claims of the present disclosure.

Referring now to FIG. 1, a network implementation 100 of a system 102 to train an avatar to assist a user in career advancement is disclosed. Initially, the system 102 may receive user information from a user. In an example, the software may be installed on a user device 104-1. It may be noted that the one or more users may access the system 102 through one or more user devices 104-2, 104-3 . . . 104-N, collectively referred to as user devices 104, hereinafter, or applications residing on the user devices 104. The system 102 may receive user information from a user. Further, the system may also 102 receive feedback from a user using the user devices 104. Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 to train an avatar to assist a user in career advancement. At first, a user may use the user device 104 to access the system 102 via the I/O interface 110. The user may register the user devices 104 using the I/O interface 110 in order to use the system 102. In one aspect, the user may access the I/O interface 110 of the system 102. The detail functioning of the system 102 is described below with the help of figures.

The present subject matter discloses the system 102 to train an avatar to assist a user in career advancement. Initially, the system may receive an input from a user to select an avatar. The user may select the avatar from a plurality of avatar stored in the system. In an embodiment, the user may also create or upload the avatar in the system.

Further to selecting an avatar, the system may receive user information from the user. The user information may comprise academic qualifications and work experience. In an example and not by way of any limitation, the academic qualifications may be at least one of a certificate awarded to the user, a degree completed by the user, a grade scored by the user and alike. The work experience may comprise past jobs, experience at past jobs, current job, experience at current job, past job applications, past job interviews, salary and past job interview results.

In an example, the system 102 may receive user information comprising academic qualifications and work experience. The academic qualifications may comprise "Bachelor's in Technology (B-Tech) in Electronics Engineering," "cumulative score of the student during the engineering (e.g. 90%)," "Trained in Embedded Systems," "Trained in Product Management" or alike. In the example, the work experience may be "Two years' work experience at Company A", "Job Role—Assistant Programmer", "Minimum growth during the job, unsuitable work culture, unsuitable projects", "One year at Company B", "Job Role—Programming Intern, Assistant Programmer, Assistant Software Developer" "Suitable Projects", "Promoted twice", "Excellent Work Culture", "Interviewed for Google", "Job Role—Software Developer", "Cleared the HR round", "Cleared Technical Round 1", "Failed Technical Round 2", "Questions asked in the Technical Round 1, Technical Round 2, HR round" or alike.

Further to receiving the information, the system 102 may extract skills and interests of the user based on the user information. The skills and interests of the user may be extracted using a predefined machine learning model. In an embodiment, the skills and interests may be calculated based on the academic qualifications and work experience using a predefined machine learning model.

The predefined machine learning model may be trained using Natural Language Processing (NLP) and Natural Language Understanding (NLU) algorithms on a training dataset of the user information. The machine learning algorithms may be trained using training datasets to identify the skills and the interests of the user from the user information based on the training dataset. In one aspect, the skills and the interests of the user may be identified using Euclidean distance technique.

Subsequent to receiving the user information, the system 102 may dynamically design a training program based on the user information. The training program may be designed using deep learning and machine learning algorithms. It may be noted that the training program may comprise a sequence of questions and template response for one or more questions of the sequence of questions. The sequence of questions may be determined based on the user information using a reinforcement learning technique. In an embodiment, the sequence of questions may comprise at least one of behavioral question, a gamified question, a psychological question and a performance evaluation question. It may be noted that the template response may comprise at least one of a format of the response, content of the response and a length of the response.

In an example, the system may design the training program comprising a sequence of questions and a template response for each question from of the sequence of questions. The sequence of questions may comprise "What do you think about Google's new Cloud Department in Michigan?", "Would you prefer working at Facebook® or Tesla®?", "What do you think about Elon Musk?", "Would you prefer to take a tollway (Toll charge—10$) to save 30 minutes of commute time or take a freeway?", "Find the correct path out of a maze." The template response for "What do you think about Google's new Cloud Department in Michigan?" may be "Answer Format—Voice, Content—Positive views about Google, Length—2 minutes".

Further, the system 102 may nudge the user with a question from the sequence of questions. The question may be asked by the system in real time based on the training program. In the above example, the system may nudge the user "Would you prefer to take a tollway (Toll charge—10$) to save 30 minutes of time or take a freeway??" In another example, the system may ask the user to draw a path through a maze. In an embodiment, the user may submit a user response in at least a voice, a video, or a text format.

Further to receiving the user response, the system 102 may evaluate the user response based on the template response for the question. The user response may be evaluated using natural language processing, image processing and predefined machine learning algorithms. The machine learning algorithms may be trained using a training dataset of the user responses and the template responses. The machine learning algorithm may be trained to calculate a satisfaction score. The satisfaction score may be calculated by measuring the Euclidean Distance between the user response and the template response for the question using NLP. The Euclidean distance may be calculated by mapping the user response and the template response for the question on a 3D vector graph.

Subsequent to evaluating the user response, the system 102 may modify the sequence of questions based on the evaluation of the user response. The sequence of question may be modified when the satisfaction score is below a predefined threshold. The sequence of questions may be modified by adding or removing a plurality of questions based on the evaluation. The sequence of questions may be modified using reinforcement learning. In an embodiment, the system 102 generates a new question based on the evaluation. The evaluation may comprise satisfaction score for the user response. In another embodiment, the system may remove a question from the sequence of questions. The question may be removed when the template response for the question is satisfied by a user response for another question.

Further to receiving the user response, the system 102 may predict career aspirations of the user based on the user information, and the user response. In an embodiment, the career aspirations may also be referred as career traits. The career aspirations may be predicted using artificial intelligence techniques. The career aspirations may comprise job preferences, a timeline, career goals and a behavioral characteristic of the user. As an example and not by way of limitation, the job preferences may comprise at least one of preferred time of work, a job role, and a type of employer. As an example and not by way of limitation, the career goals may be at least one of "Promotion to a senior position," "Change in career," "Acceptance for a job," "200,000 U.S. Dollars per annum salary package" and alike. As an example and not by way of limitation, the behavioral characteristic may comprise at least one of motivation, determination, enthusiasm, optimism, pessimism, envy and alike.

Consider an example, let us assume that the question nudged by the system is "What do you think about the start-up culture?" Let the response be "Start-up is a buzz word, there is no such thing as a start-up. It is just a business in the early stage. Start-ups lack discipline." It may be noted that the response may also be in a video format, an image format, and an audio format. The system may use natural language processing and pre-trained machine learning algorithms to identify the behavioral characteristic and job preferences from the response. Considering the above example, the system predicts the behavioral characteristics—"a negative tone", "lack of enthusiasm", or alike in the response. The system also predicts the job preferences from the response. Considering the above response, "Start-ups not preferred", "Regular work time preferred", or alike.

Upon predicting the career aspirations of the user, the system 102 may determine a career path for the user. It may be noted that the career path may be determined based on the career aspirations and the user information. The career path may comprise a set of steps and a schedule to complete the set of steps. The career path may be calculated using federated learning and deep learning algorithms. The timeline may be received from the user to represent the amount of time in the future considered to determine the career path. Let us assume that the timeline is "Four Years". Let us assume the career aspirations and the user information as shown in Table A. The system 102 may determine a career path comprising a set of steps and a schedule to complete the set of steps. The career path may be determined to achieve the career goal in four years. Let us assume the set of steps and the schedule to complete the set of steps as shown in Table B.

TABLE A

| User Information | Career aspirations |
|---|---|
| Engineer | Preferred work time-7 hours |
| Masters in Machine Learning | Goal-To earn at least 5 times of the current salary |
| Working at Company X | Optimistic |
| Current Salary-50,000 USD per annum | Highly Determined |
| Interested in virtual reality, gaming, designing | |

TABLE B

| Set of Steps | Schedule to complete the set of steps |
|---|---|
| Find a training course for Virtual Game development | In one month |
| Complete the training course | In one year |
| Apply for a job role of virtual reality engineer at Company A | After completing the training course |
| Schedule an interview | After acceptance of job application |
| Resign from job at Company X | After passing the interview |

In an embodiment, system may use external data sources such as job application websites, professional databases, social media networks to gather data about job opportunities related to gaming. The career system may identify a job role that may have a salary package of 250,000 USD per annum. The career system may identify that the job may require masters in Machine learning and MBA in product management. The career system may identify the requirements based on data from external data sources. The data may be "qualifications of past Project Lead at Company A", "job listings at Company A".

Finally, the system 102 may train an avatar based on the career path using federated learning and edge computing. The avatar may be trained to assist the user through the career path by performing a subset of steps from the set of steps on behalf of the user. It may be noted that the steps performed by the avatar may be selected using edge computing and federated learning. It may be noted that the user may approve or disapprove the selected steps. The avatar may perform at least one of the steps from the set of steps. For example, the avatar may "apply for a job role based on the career path", "Schedule an interview", "accept or reject a job opportunity based on the career aspirations and user information".

In particular embodiments, the system 102 may nudge the user with the question on a daily basis. It may be noted that the goal of the invention is to train the avatar to assist the user for career advancement. The system 102 nudges the user with a question and evaluates the response received for the question. It may be noted that the avatar continuously evolves based upon the user's response.

Consider an example, the system 102 receives user information comprising academic qualifications and work experience from a user. Let us assume that the academic qualifications comprise grades of the user, details related to school, colleges and universities, extracurricular information and co-curricular information. The work experience may comprise previous work experience and current work experience. Further, the system 102 may build a training program avatar based on the user information. The training program is a sequence of questions for the user. The system may nudge the user with one or more questions from the sequence of questions. Let us assume that the system nudges the user with a question—"Do you prefer to try a new café on a date?" Further, the user may submit the response to the question. It may be noted that the user may submit a one-word answer or a detailed answer. The system may analyses the response in real time. Let us assume that the response is "No. I always prefer known café when on a date." The system may extract insights from the response. It may be noted that the system may ask a bunch of questions to the user in order to accurately judge the user. The questions may be related to Jobs, Education, technologies, Relationship and alike. Based upon the user response and the user information, the system may predict career aspirations of the user. The career aspirations may comprise job preferences, a timeline, career goals and a behavioral characteristic of the user. Let us assume that the system predicts that the user prefers a healthy lifestyle, and the user would not be interested working in a night shift. Likewise, the system may draw bunch of insights related to the user. Further, the system may determine a career path for the user based on the career aspirations. In the example, the career path may be "Learn Advance Java and Python in next 3 months," and "Connect with Professor A to grow your network". Finally, an avatar may be trained based on the career path using federated learning and edge computing to mimic the user.

Consider an example, the system receives user information comprising academic qualifications and work experience from a user. Let's assume the academic qualifications as shown in Table C.

TABLE C

| Academic qualifications | Work experience |
|---|---|
| LLB with honors Specialization in Intellectual Property Rights | Worked at ABC Law Firm from 2019-2020 Job role-Associate |
| B. Tech. In Computer Science | Experience-Heavy Workload, insufficient compensation for the work Salary-100,000 USD per annum |

The system 102 may dynamically design a training program for the user based on the user information. The training program may comprise a sequence of questions such as behavioral question, gamified questions, psychological questions and performance evaluation questions and a template response for each question of the sequence of questions. Let's assume the sequence of questions for the given example is:

1. Why did you complete an Engineering Degree after a Law Degree?
2. What do you think about Metaverse?
3. What do you think about Company A selling their patent portfolio?
4. What do you think about start-ups?
5. What would you do if you lose your job due to corona?
6. How did corona affect you?
7. Would you prefer a comfortable job with a low salary over an intensive job with a high salary?
8. Who do you live with?

In particular embodiments, the system may provide options related to the question to the user. The user may select an option to answer the question. The system may nudge the user to respond to Question 2. Further, the system may receive a response from the user. Let's assume that the response is a text response—"I am not interested in Tech". Let's assume the template response for the 2$^{nd}$ question is as shown in Table D.

TABLE D

| | Template Response |
|---|---|
| Format | Text/Audio/Video |
| Content | News, Technical view, Personal view |
| Length | 100 to 200 words |

The system may evaluate the response as unsatisfactory for content and length. The system further analyses the response and the template response under the content. The system may deduce that news, technical view is missing in the response. The system may also determine that the user does not relate to technology. The system may modify the sequence of questions by adding questions related to the field of law. For example, "What do you think about a recent news event?"

The system may then predict career aspirations of the user based on the response received from the user to the questions from the sequence of questions. In the given example, let us assume that the response for question 4 is "Start-ups are the future. It is amazing how many innovative start-ups have been emerging recently. Start-ups provide a high volume of interesting job opportunities". The system may predict the job preferences based on the response. For this example, the system may predict that the job preferences may be "prefer working in a start-up", "prefer a dynamic job responsibility" from the response to question 4. The system may predict that the user may prefer "Patent Agent job role", "Intellectual Property manager job role", the user's goal may be "Become a Patent Agent" based on the response to the questions. Further, the system may predict behavioral characteristics based on the user response. In this example, the behavioral characteristics of the user may be "Excited about start-ups", "Motivated towards Patents", "Optimistic", "Highly Determined", "Direct". In an embodiment, the system may predict a timeline based on the user response. Let's assume that the timeline is "6 years".

The system may determine a career path for the user based on the career aspirations and the user information. The career path may comprise a set of steps and a schedule to complete the set of steps. In the example, the system may determine a career path to become "In-house Intellectual Property Counsel for Company C". For the example, the set of steps and the schedule to complete the set of steps may be:
1. Register for the Patent Agent Exam in one week.
2. Prepare for the Patent Agent Exam in six months.
3. Search for Intellectual Property focused jobs/internships at well-known Law Firms in one month after passing the Patent Agent exam.
4. Schedule Interviews at the jobs/internships in four months after passing the Patent Agent exam.
5. Work at 3 well-known Law Firms for 2 years after passing the Patent Agent Exam.
6. File fifteen patents as a patent agent in the 2 years working at well-known Law Firms.
7. Apply for Legal associate at Company C in 1 year after working at Law Firms.
8. Take up Patent filing related responsibilities at Company C for 1 year after joining.
9. Apply for the job role of In-house Counsel at Company C after completing 1 year as Legal associate specializing in patents.

Subsequently, the system may train an avatar based on the career path determined. The avatar is trained to assist the user by performing a subset of steps from the set of steps on behalf of the user. It may be noted that the user may select the steps that the avatar may perform. For this example, let's assume that the user selects tasks 3, 4, 7 for the avatar. The avatar may search for jobs/internships on the internet, the avatar may send applications and schedule interviews for the user. The avatar may respond to emails for scheduling the interviews. The avatar may accept or reject a job/internship based on the career aspirations and the user information.

Figure 2:
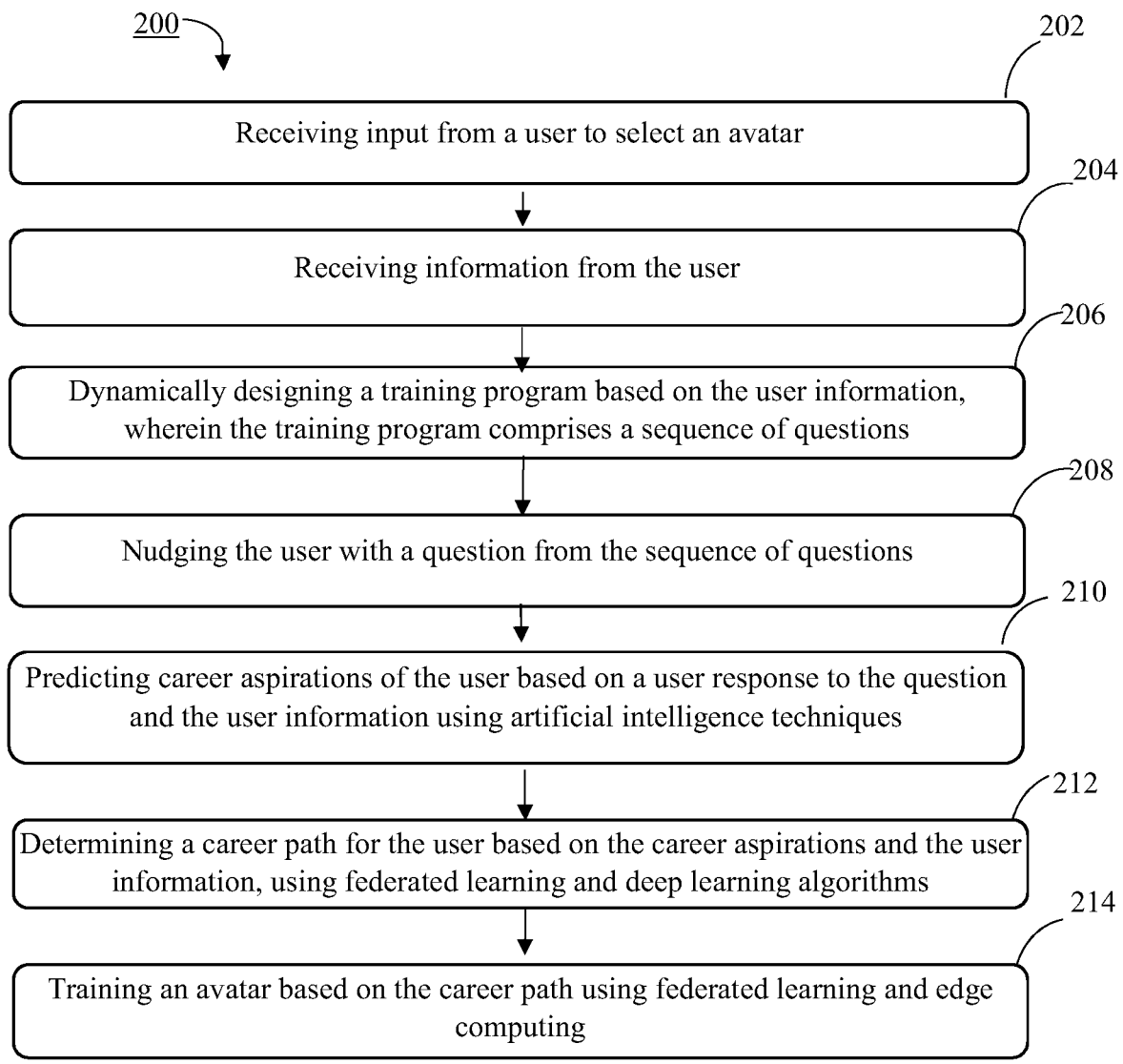
FIG. 2 illustrates a method to assist a user for career advancement, in accordance with an embodiment of the present subject matter.

Referring now to FIG. 2, a method 200 to train an avatar to assist a user in career advancement is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods to train an avatar to assist a user for career advancement. Additionally, individual blocks may be deleted from the method 200 without departing from the scope of the subject matter described herein. Furthermore, the method 200 to train an avatar to assist a user in career advancement can be implemented in any suitable hardware, software, firmware, or combination thereof. However, for ease of explanation, in the embodiments described below the method 200 may be considered to be implemented in the above-described system 102.

At block 202, an input from a user to select an avatar may be received.

At block 204, user information comprising academic qualifications and work experience may be received from the user.

At block 206, a training program may be dynamically designed to train an avatar based on the user information. The training program may be designed using deep learning and machine learning algorithms. The training program may correspond to a sequence of questions determined based on the user information. The sequence of questions may be determined using reinforcement learning technique.

At block 208, nudging the user with a question from the sequence of questions. The question may be asked to the user by the avatar in real time based on the training program.

At block 210, career aspirations of the user may be predicted based on a response to the question and the user information. The career aspirations may be predicted using artificial intelligence techniques. The career aspirations may correspond to job preferences, a timeline, career goals and a behavioral characteristic of the user.

At block 212, a career path may be determined for the user based on the career aspirations and the user information. The career path may comprise a set of steps and a schedule to complete the steps.

At block 214, the avatar may be trained using federated learning and edge computing. It may be noted that the avatar may assist the user through the career path by performing a subset of steps from the set of steps on behalf of the user.

Figure 3:
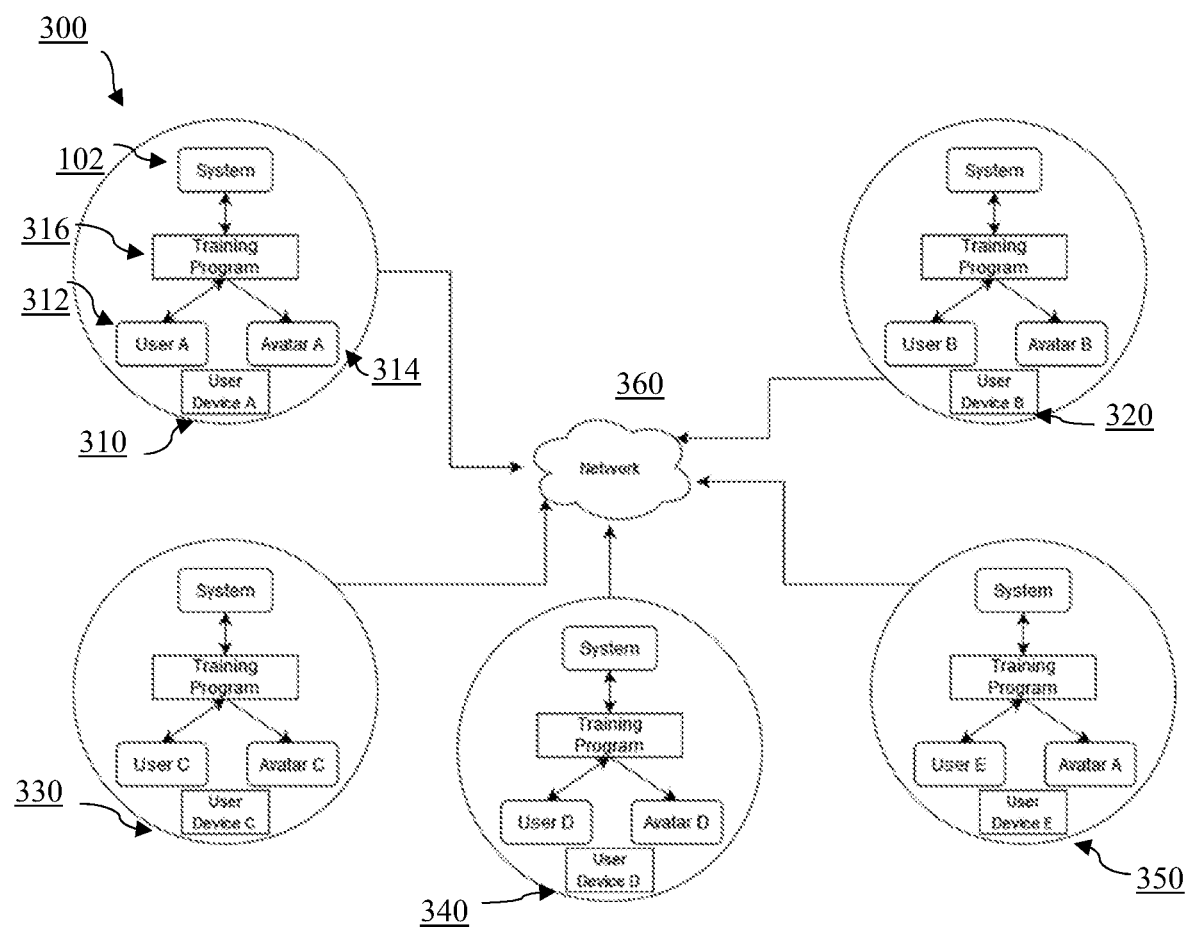
FIG. 3 illustrates network of a plurality of users, in accordance with an embodiment of the present subject matter.

FIG. 3 illustrates an example view 300 of a network of multiple users. The example network view comprises a User Device A 310, User Device B 320, User Device C 330, User Device D 340, User Device E 350 and a network 360. The User Device A comprises the system 102, a training program 316, a User A 312, and an Avatar A 314. The network 360 facilitates communication between User Devices A, B, C, D, and E. In an embodiment, User Device A may communicate with the User Device B to train the avatar A 314 using federated learning and edge computing. The User A 312 interacts with the system 312 through the training program 316 to train the Avatar A 314. It may be noted that the system 102 processes information received from the User A 312 to design the training program 316.

Figure 4:
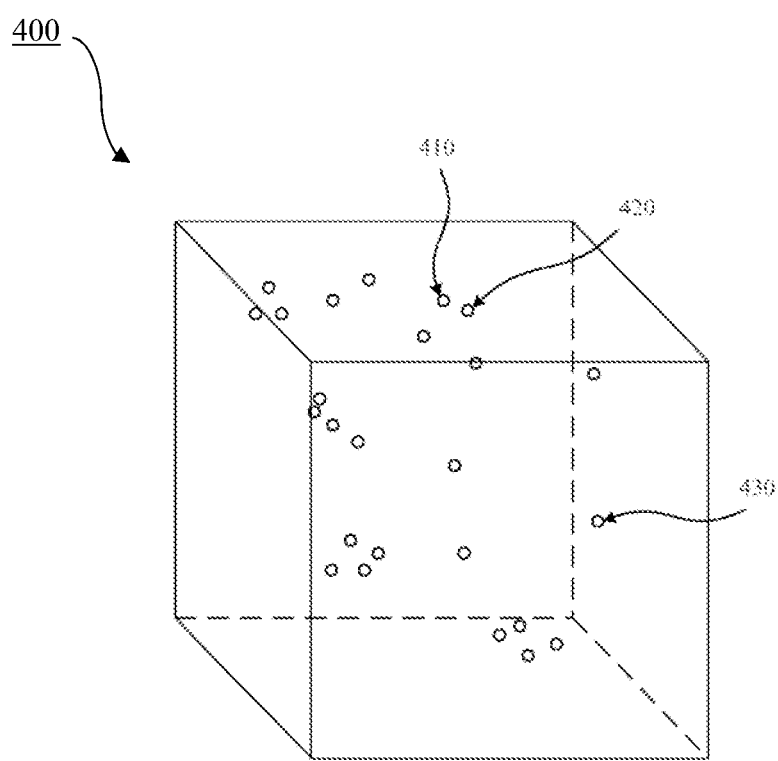
FIG. 4 illustrates an example view of an embedding space, in accordance with an embodiment of the present subject matter.

FIG. 4 illustrates an example view of a vector space 400. In particular embodiments, an object or an n-gram may be represented in a d-dimensional vector space, where d denotes any suitable number of dimensions. Although the vector space 400 is illustrated as a three-dimensional space, this is for illustrative purposes only, as the vector space 400 may be of any suitable dimension. In particular embodiments, an n-gram may be represented in the vector space 400 as a vector referred to as a term embedding. Each vector may comprise coordinates corresponding to a particular point in the vector space 400 (i.e., the terminal point of the vector). As an example and not by way of limitation, vectors 410, 420, and 430 may be represented as points in the vector space 400, as illustrated in FIG. 4.

As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 400. In particular embodiments, an n-gram may be mapped to a vector representation in the vector space 400 by using a machine leaning model (e.g., a neural network). The machine learning model may have been trained using a sequence of training data (e.g., a corpus of objects each comprising n-grams).

In particular embodiments, an object may be represented in the vector space 400 as a vector referred to as a feature vector or an object embedding. In particular embodiments, an object may be mapped to a vector based on one or more properties, attributes, or features of the object, relationships of the object with other objects, or any other suitable information associated with the object. As an example and not by way of limitation, an object comprising a video or an image may be mapped to a vector by using an algorithm to extract skills and interests of the user based on the user information provided by the user. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. Although this disclosure describes representing an n-gram or an object in a vector space in a particular manner, this disclosure contemplates representing an n-gram or an object in a vector space in any suitable manner.

In particular embodiments, the system 102 may calculate a similarity metric of vectors in vector space 400. A similarity metric may be a cosine similarity, a Minkowski distance, a Mahalanobis distance, a Jaccard similarity coefficient, or any suitable similarity metric. The similarity metric of two vectors may represent how similar the two objects or n-grams corresponding to the two vectors, respectively, are to one another, as measured by the distance between the two vectors in the vector space 400. As an example and not by way of limitation, vector 410 and vector 420 may correspond to objects that are more similar to one another than the objects corresponding to vector 410 and vector 430, based on the distance between the respective vectors. Although this disclosure describes calculating a similarity metric between vectors in a particular manner, this disclosure contemplates calculating a similarity metric between vectors in any suitable manner.

Figure 5:
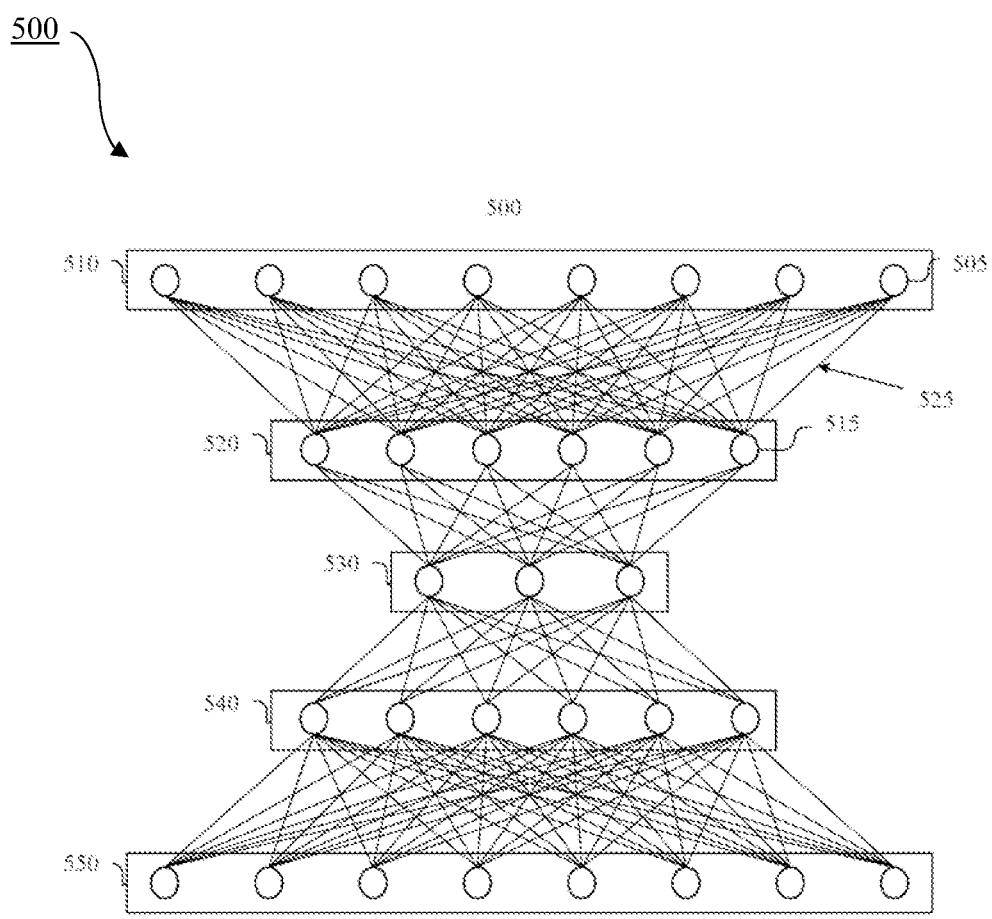
FIG. 5 illustrates an example artificial neural network, in accordance with an embodiment of the present subject matter.

FIG. 5 illustrates an example artificial neural network ("ANN") 500 of the deep learning algorithms. In particular embodiments, an ANN may refer to a computational model comprising one or more nodes. Example ANN 500 may comprise an input layer 510, hidden layers 520, 530, 560, and an output layer 550. Each layer of the ANN 500 may comprise one or more nodes, such as a node 505 or a node 515. In particular embodiments, each node of an ANN may be connected to another node of the ANN. As an example and not by way of limitation, each node of the input layer 510 may be connected to one of more nodes of the hidden layer 520. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 5 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 5 depicts a connection between each node of the input layer 510 and each node of the hidden layer 520, one or more nodes of the input layer 510 may not be connected to one or more nodes of the hidden layer 520.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 520 may comprise the output of one or more nodes of the input layer 510. As another example and not by way of limitation, the input to each node of the output layer 550 may comprise the output of one or more nodes of the hidden layer 560. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be $F(x)+x$, where $F(x)$ may be the output of residual block $N-1$, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function.

In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 525 between the node 505 and the node 515 may have a weighting coefficient of 0.4, which may indicate that 0.4 multiplied by the output of the node 505 is used as an input to the node 515. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, the ANN may be trained using training data. As an example and not by way of limitation, training data may comprise inputs to the ANN 500 and an expected output. As another example and not by way of limitation, training data may comprise vectors each representing a training object and an expected label for each training object. In particular embodiments, training the ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, the ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training the ANN in a particular manner, this disclosure contemplates training the ANN in any suitable manner.

Exemplary embodiments discussed above may provide certain advantages. Though not required to practice aspects of the disclosure, these advantages may include those provided by the following features.

Some embodiments may enable the system to assist the user to improve efficiency and speed of the career advancement.

Some embodiments may enable the system to calculate a career path for the user based on the career aspirations of the user and the user information.

Some embodiments may enable the system to help in saving time of job seekers by taking actions on behalf of the job seeker.

Some embodiments may enable the system to enable streamlining conversations between a job seeker and a company.

Some embodiments may enable the system to enable training of a virtual avatar based on the user's response.

Some embodiments may enable the system to enable generation of a training program to train the virtual avatar based on the user information.

Some embodiments may enable the system to enable selection of the virtual avatar by the user.

Some embodiments may enable the system to predict and suggest achievable goals for the user.

Some embodiments may enable the avatar to learn continuously based on the user's inputs using federated learning.

Some embodiments may enable the system to be dynamically update the sequence of questions based on user's response in real-time.

Although implementations for methods and the systems to train an avatar to assist a user for career advancement have been described in a language specific to structural features and/or methods, it is to be understood that the appended claims are not necessarily limited to the specific features or methods described. Rather, the specific features and methods are disclosed as examples of implementations to train an avatar to assist a user for career advancement.

The invention claimed is:

1. A system to train an avatar to assist a user in career advancement, the system comprises:
   a memory; and
   a processor coupled to the memory, wherein the processor is configured to execute instructions stored in the memory for:
   receiving an input to select an avatar for a user;
   receiving user information comprising an academic qualification and work experience of the user;
   extracting skills and interests of the user from the user information using a machine learning model;
   designing a training program comprising a sequence of questions based on the skills and the interests extracted from the user information using deep learning and machine learning algorithms;
   rendering at least a question from the sequence of questions on a display for the user;
   evaluating a user response, received for the question, based on a template response for the question using a machine learning model to calculate a satisfaction score for the user response, wherein the template response comprises at least one of a format of the response, content of the response and a length of the response;
   modifying the training program in real-time based on the satisfaction score of the user response;
   predicting career aspirations of the user based on the user response, and the user information, wherein the career aspirations are predicted using artificial intelligence techniques, and wherein the career aspirations comprise job preferences, a timeline, career goal, and a behavioral characteristic of the user;
   determining a career path for the user based on the career aspirations and the user information, wherein the career path comprises a set of steps and a schedule to complete the set of steps, and wherein the career path is determined using federated learning and deep learning algorithms; and continuously training the avatar based on the career path using federated learning and edge computing, wherein the avatar is trained to assist the user through the career path by performing a subset of steps from the set of steps on behalf of the user.

2. The system of claim 1, wherein the avatar is a digital representation of the user.

3. The system of claim 1, wherein the job preferences are at least one of a preferred time of work, responsibilities, a job role, a type of employer, and wherein the job preferences are assigned weights using federated learning and edge computing, and wherein the weights are used to determine priority of the job preferences.

4. The system of claim 1, wherein the behavioral characteristic is determined using natural language processing and artificial intelligence techniques.

5. The system of claim 1, wherein the timeline is received from the user, and wherein the timeline represents the amount of time in the future considered to determine the career path.

6. The system of claim 1, wherein the sequence of questions comprises at least one of behavioral question, a gamified question, a psychological question, and a performance evaluation question.

7. The system of claim 1, wherein the set of steps and the schedule to complete the set of steps is calculated based on the career path, the career goal and the timeline using a predefined machine learning model and federated learning technique.

8. A method to train an avatar to assist a user in career advancement, the method comprises:
   receiving, by a processor, an input to select an avatar for a user;
   receiving, by the processor, user information comprising an academic qualification and work experience of the user;
   extracting, by the processor, skills and interests of the user from the user information using a machine learning model;
   designing, by the processor, a training program comprising a sequence of questions based on the skills and the interests extracted from the user information using deep learning and machine learning algorithms;
   rendering, by the processor, at least a question from the sequence of questions on a display for the user;
   evaluating, by the processor, a user response, received for the question, based on a template response for the question using a machine learning model to calculate a satisfaction score for the user response, wherein the template response comprises at least one of a format of the response, content of the response and a length of the response;
   modifying, by the processor, the training program in real-time based on the satisfaction score of the user response;
   predicting, by the processor, career aspirations of the user based on a user response to the question and the user information, wherein the career aspirations are predicted using artificial intelligence techniques, and wherein the career aspirations comprise job preferences, a timeline, career goal, and a behavioral characteristic of the user;
   determining, by the processor, a career path for the user based on the career aspirations and the user information, wherein the career path comprises a set of steps and a schedule to complete the set of steps, and wherein the career path is determined using federated learning and deep learning algorithms; and
   continuously training, by the processor, the avatar based on the career path using federated learning and edge computing, wherein the avatar is trained to assist the user through the career path by performing a subset of steps from the set of steps on behalf of the user.

9. The method as claimed in claim 8, wherein the avatar is a digital representation of the user.

10. The method as claimed in claim 8, wherein the job preferences are at least one of preferred time of work, responsibilities, a job role, a type of employer, and wherein the job preferences are assigned weights using federated learning and edge computing, and wherein the weights are used to determine priority of the job preferences.

11. The method as claimed in claim 8, wherein the behavioral characteristic is determined using natural language processing and artificial intelligence techniques.

12. The method as claimed in claim 8, wherein the timeline is received from the user, and wherein the timeline represents the amount of time in the future considered to determine the career path.

13. The method as claimed in claim 8, wherein the sequence of questions comprises at least one of behavioral question, a gamified question, a psychological question, and a performance evaluation question.

14. The method as claimed in claim 8, wherein the set of steps and the schedule to complete the set of steps is calculated based on the career path, the career goal and the timeline using a predefined machine learning model and federated learning technique.

15. A non-transitory computer program product having embodied thereon a computer program to assist a user for career advancement, the computer program product storing instructions for:
   receiving an input to select an avatar for a user;
   receiving user information comprising an academic qualification and work experience of the user;
   extracting skills and interests of the user from the user information using a machine learning model;
   designing a training program comprising a sequence of questions based on the skills and the interests extracted from the user information using deep learning and machine learning algorithms;
   rendering at least a question from the sequence of questions on a display for the user;
   evaluating a user response, received for the question, based on a template response for the question using a machine learning model to calculate a satisfaction score for the user response, wherein the template response comprises at least one of a format of the response, content of the response and a length of the response;
   modifying the training program in real-time based on the satisfaction score of the user response;
   predicting career aspirations of the user based on the user response, and the user information, wherein the career aspirations are predicted using artificial intelligence techniques, and wherein the career aspirations comprise job preferences, a timeline, career goal, and a behavioral characteristic of the user;
   determining a career path for the user based on the career aspirations and the user information, wherein the career path comprises a set of steps and a schedule to complete the set of steps, and wherein the career path is determined using federated learning and deep learning algorithms; and continuously training the avatar based on the career path using federated learning and edge computing, wherein the avatar is trained to assist the user through the career path by performing a subset of steps from the set of steps on behalf of the user.

\* \* \* \* \*